(12) United States Patent
Schwarz

(10) Patent No.: US 6,860,079 B2
(45) Date of Patent: Mar. 1, 2005

(54) CONSTRUCTION ELEMENT FOR BUILDING THAT ACCUMULATES LATENT HEAT

(75) Inventor: Dietrich Schwarz, Domat/Ems (CH)

(73) Assignee: GlassX AG (CH)

( * ) Notice: Subject to any disclaimer, the term of this patent is extended or adjusted under 35 U.S.C. 154(b) by 0 days.

(21) Appl. No.: 10/181,343

(22) PCT Filed: Jan. 16, 2001

(86) PCT No.: PCT/CH01/00024

§ 371 (c)(1),
(2), (4) Date: Jul. 17, 2002

(87) PCT Pub. No.: WO01/53756

PCT Pub. Date: Jul. 26, 2001

(65) Prior Publication Data

US 2003/0000171 A1 Jan. 2, 2003

(30) Foreign Application Priority Data

Jan. 20, 2000 (CH) ................................................ 0108/00

(51) Int. Cl.⁷ .................................................. F24J 2/04
(52) U.S. Cl. ...................... 52/786.1; 52/794.1; 126/907
(58) Field of Search ............................ 52/786.1, 794.1, 52/173.3; 126/907, 908

(56) References Cited

U.S. PATENT DOCUMENTS

| 2,595,905 | A | | 5/1952 | Telkes |
| 3,000,375 | A | * | 9/1961 | Golay ........................ 126/569 |
| 4,112,918 | A | * | 9/1978 | Palkes ........................ 126/596 |
| 4,301,787 | A | * | 11/1981 | Rice ........................... 126/702 |
| 4,572,864 | A | | 2/1986 | Benson et al. |
| 4,722,325 | A | * | 2/1988 | Fulkerson ................... 126/701 |
| 4,846,151 | A | | 7/1989 | Simko, Jr. |
| 5,514,476 | A | * | 5/1996 | Hartig et al. ............... 428/426 |
| 5,532,039 | A | * | 7/1996 | Payne et al. ................ 428/116 |
| 5,770,295 | A | | 6/1998 | Alderman |
| 6,613,404 | B2 | * | 9/2003 | Johnson ...................... 428/34 |

FOREIGN PATENT DOCUMENTS

| CH | 688 164 A5 | 5/1997 |
| DE | 37 18844 A1 | 12/1988 |
| WO | 98/51973 A | 11/1998 |

\* cited by examiner

Primary Examiner—Carl D. Friedman
Assistant Examiner—Basil Katcheves
(74) Attorney, Agent, or Firm—Webb Ziesenheim Logsdon Orkin & Hanson, P.C.

(57) ABSTRACT

The invention relates to a construction element that comprises at least one first transparent pane and a parallel second pane that is at least partly transparent and contains a material that accumulates latent heat. The material that accumulates latent heat is dyed or pigmented so that it absorbs light in the infrared range of the solar spectrum. The construction element claimed by the invention is highly efficient in absorbing light directly in the material that accumulates latent heat.

11 Claims, 3 Drawing Sheets of transparent panes 10, 11 that can be fabricated from glass or

CONSTRUCTION ELEMENT FOR BUILDING THAT ACCUMULATES LATENT HEAT

BACKGROUND OF THE INVENTION

1. Field of the Invention

The present invention generally relates to a construction element and, more particularly, to a construction element that accumulates latent heat.

2. Brief Description of the Prior Art

CH-A-688 describes a construction element that accumulates latent heat. One of the walls of a space is enclosed from the exterior by a wall which has on the outside a transparent thermal insulation and on the inside a space formed by two panes. This space is occupied by a substance that accumulates latent heat, such as calcium chloride hexahydrate, for example.

SUMMARY OF THE INVENTION

The object of this invention is to develop a construction element so that it is more efficient in terms of light absorption. This object is accomplished by a construction element that includes at least one first transparent pane and a second pane parallel to said first pane, which second pane contains a material that accumulates latent heat, wherein the material that accumulates latent heat is dyed or pigmented so that it absorbs light, at least in the infrared range of the solar spectrum.

BRIEF DESCRIPTION OF THE DRAWINGS

The invention is explained in greater detail below with reference to the exemplary embodiments that are illustrated in the accompanying drawings, and in which.

DETAILED DESCRIPTION OF THE PREFERRED EMBODIMENTS

Figure 1:
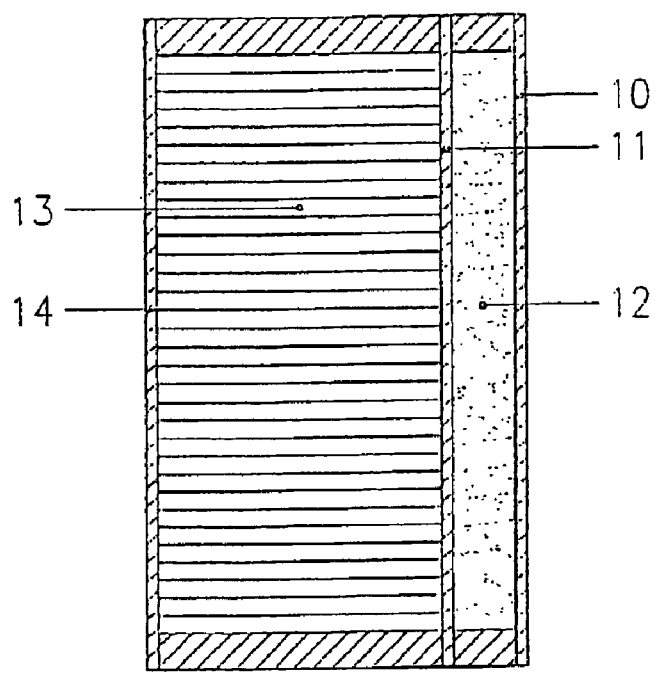
FIGS. 1–6 show cross sections through different embodiments of the invention.

The construction element illustrated in FIG. 1 consists of transparent panes 10, 11 that can be fabricated from glass or plastic. They form a space between them. This space is sealed and filled with a material 12 that accumulates latent heat. The heat of melting of the material 12 that accumulates latent heat is utilized to store thermal energy. Preference is given to the use of a material that melts at room temperature, such as calcium chloride hexahydrate or paraffin. In this manner, it becomes possible during the melting process in the range of room temperature to store several times more thermal energy in the material that accumulates latent heat than in conventional construction materials such as concrete or brick. These materials are poured into the space at temperatures that are above the melting point or are co-extruded with the panes 10, 11. It is also possible to introduce the material that accumulates latent heat between the panes 10, 11 in solid form. The air in the minimal voids is then advantageously evacuated, so that it does not adversely affect the thermal conduction of the construction element. When paraffin is used as the material that accumulates latent heat, it is also possible to also make the paraffin retain its shape even during the solid/liquid phase transition by using supporting materials. The paraffin is distributed in the supporting material completely uniformly, and no liquid paraffin escapes even at high operating temperatures. An additional method of introducing the paraffin between the panes 10, 11 so that it retains its shape is to enclose the paraffin in sealed hollow bodies 25, so that these hollow bodies filled with paraffin can be stacked in a dry process between the panes 10, 11. These hollow bodies are advantageously fabricated from plastic. Some or all of the static pressure that is produced by the stacked hollow bodies 25 can thereby be used to make the hollow bodies 25 adhere to one another and to the panes 10 and 11. The result is a static composite structure that also increases the stability of the panes 10, 11.

The material 12 that accumulates the latent heat is dyed or pigmented so that it absorbs light in the infrared range of the solar spectrum. It is preferably a dark color, so that the sunlight is absorbed directly in the material 12 that accumulates latent heat. The absorbed energy is stored in the form of thermal energy in the material that accumulates latent heat and is discharged slowly and continuously in the form of thermal radiation into the interior of the room. This color must be dark enough that as much incident solar radiation as possible is absorbed by the material 12 that accumulates latent heat without overheating the interior of the room with the transmitted solar radiation. The absorptivity of the coloring must be determined as a function of the location and the type of construction of the building. For example, on a building that uses lightweight construction, where the construction element forms an exterior wall directly, more light is absorbed in the material that accumulates latent heat than in a building with a more solid construction, in which the construction is a facade element that covers a wall. Other factors that must also be taken into consideration include the conventional window area of the facades facing the sun and the expected solar radiation at the location of the building. During the absorption of sunlight in the material 12 that accumulates latent heat, the characteristics of the material are also utilized to advantage. The latent heat storage material paraffin transmits significantly more light in its liquid state than in the solid state. It also has poor thermal conductivity. That means that when the layer of material that accumulates latent heat is exposed to solar radiation, it melts slowly from the outside to the inside, and thus the light transmission also increases from the outside to the inside. Consequently, the solar radiation ideally reaches the entire layer of material that accumulates latent heat and is stored where it is absorbed. So that the solar radiation can more effectively melt the paraffin 12, the hollow bodies 25 are provided with depressions 26 or openings to create apertures for the entry of light. The solar radiation that comes through the apertures travels deeper into the layer of material 12 that accumulates latent heat.

A further possibility of increasing the degree of absorption of the construction element is to color the transparent panes 10, 11 or the hollow bodies 25 a dark color, to paint them a dark color or to provide them with a dark coating. These colorings or coatings of the panes 10, 11 and of the hollow bodies 25 can also be used for decorative purposes.

Facing the outside of the building, the panes 10, 11 are lined on the outside with a transparent thermal insulation 13 which is enclosed by one or more additional transparent panes 14. The thermal insulation 13 can be realized, for example, as described in WO 98/51973, which is incorporated into this application by reference. The pane 14 is advantageously made of low-iron flint glass with a high light transmittance to optimize the transmission of light. For the transparent insulating layer 13, transparent plastic honeycomb or other transparent hollow chamber constructions can also be used. These transparent thermal insulators 13 have the characteristic that the air that is enclosed in the hollow chambers acts as an insulator, while the hollow chambers are so small that the convection of the air is eliminated.

Figure 2:
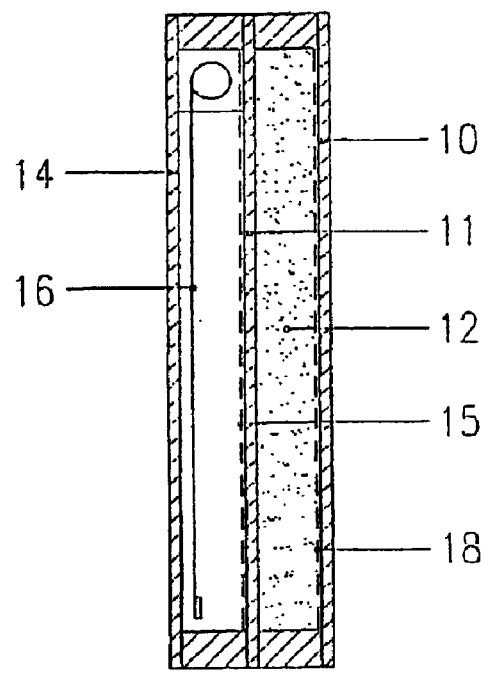
Figure 3:
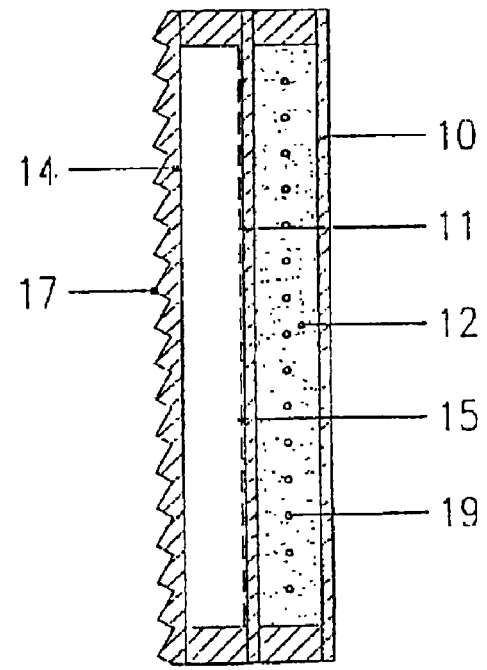
Figure 4:
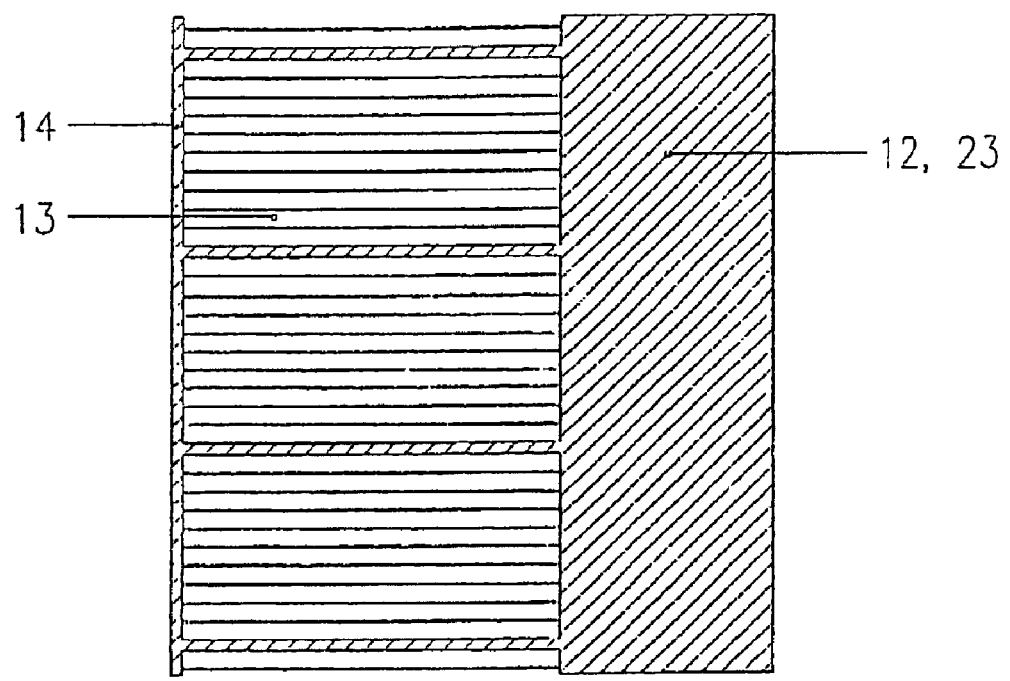

The transparent thermal insulation can also be used to fill the space between the center pane 11 and the outer pane(s) 14 with an inert gas, e.g. argon, krypton or xenon, that is an effective thermal insulator. An additional possibility is to evacuate the air in this space. A vacuum is an ideal insulator. The middle panes 11 and 14 can have a thermal insulating coating 15 (FIG. 2) on the outside or inside that is also called a Low-E coating. The outer flint glass pane 14 and the gas or vacuum layer behind it have high light transmittance. The middle glass pane 11 that is coated with thermal insulation naturally has a reduced degree of total energy transmission. The incident absorption energy is not lost energy, but is diverted inward into the material that accumulates the latent heat, because the outside insulating layer and the thermal protection coating 15 prevent any thermal loss to the exterior.

So that the thermal element does not overheat in summer, there is a shading on the outside of the layer of material that accumulates latent heat. In the exemplary embodiment illustrated in FIG. 2, the shading device 16 is located in the outer insulating space behind the external glass pane 14. This arrangement guarantees that the construction element with protection against overheating is manufactured in the form of a stable, efficient and reliable unit that does not require the use of additional shading constructions.

An additional possible way of regulating the radiation results from the fact that the outer pane 24 has prismatic elevations 17. By deflecting the light, the sunlight that is incident at a higher angle in the summer is deflected outward while the sunlight that is incident at a lower angle can pass through the pane 24 unhindered. The prisms 17 can be located both on the front side and on the reverse side of the pane 14. The principle of deflected light can also be used to product holograms, although such applications are still relatively complex and expensive. The construction element can also be used as a heating element. In a solar-heated house, additional heating sources are also required to provide the make-up heat that is required in bad weather. The pane 10 can be realized in the form of an electrical flat resistance radiator 18 facing the material 12 that accumulates the latent heat. For this purpose, conductive metal coatings are applied to the glass pane 10. An additional possibility is to integrate pipes 19 that carry water into the latent heat storage system, and as in a flat radiator, the water gives up its heat to the material that accumulates the latent heat as necessary. The material 12 that accumulates the latent heat makes it possible to feed cheaper night-rate electricity into the material that accumulates the latent heat, which can be then used later during the day in the form of heat.

An additional possible protection against summertime overheating is a metal oxide coating on the outside of the panes 14 or 11. The greater the incident angle with reference to a line perpendicular to the panes 14, 11, the greater the reflection on the outer surface of the panes 14, 11. In other words, summer sunlight that is incident at a steeper angle is reflected to a greater extent than winter sunlight that is incident at a lower angle. This configuration is also an economical solution.

Figure 5:
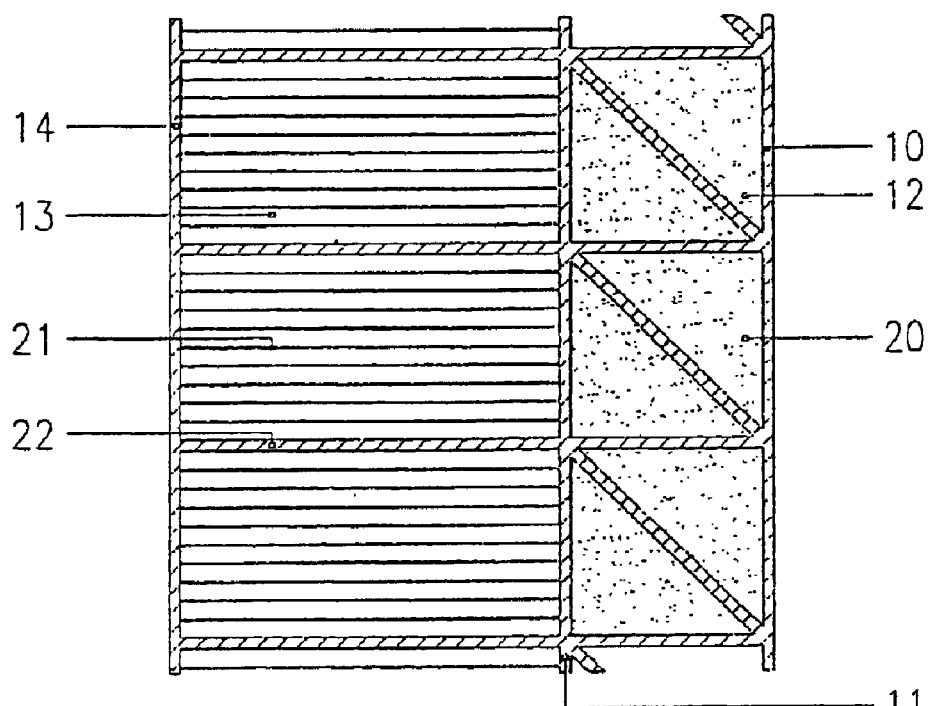
Figure 6:
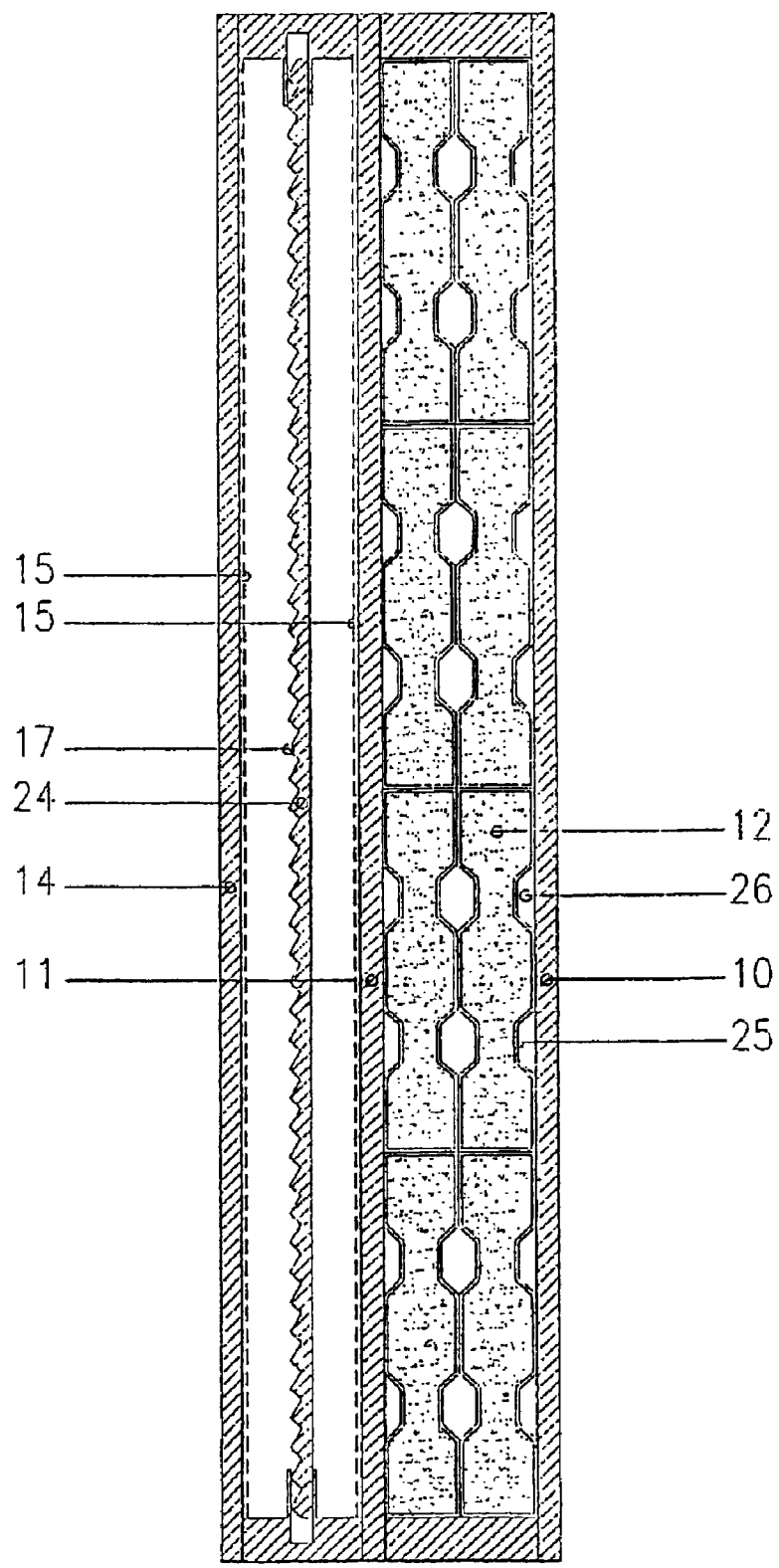

To optimize the economy of the construction element, it can be extruded in the form of a one-piece plastic element. When the material 12 that accumulates the latent heat is loose, macroscopic cavities 20 are required to hold the material 12 that accumulates the latent heat, which material does not retain its shape in its liquid state. It is advantageous if the amount of transparent plastic used to form the cavities 20 in the panes 10, 11 is minimized and the cavities are simultaneously realized so that they have a maximum capacity. This configuration can result in lattice-like structures as illustrated in FIG. 5. To optimize the efficiency of the web plates, especially in winter, the webs 21, 22 can form an acute angle with the pane 14.

What is claimed is:

1. A construction element to accumulate latent heat for buildings, comprising at least one first transparent pane and a second pane parallel to said first pane, which second pane contains a material that accumulates latent heat, wherein the material that accumulates latent heat is dyed or pigmented so that it absorbs light, at least in the infrared range of the solar spectrum, wherein one of the panes is coated with a Low-E coating and wherein means for deflecting light are arranged on one side of the first pane to deflect sunlight outward when the sun is at a high angle, and allow sunlight to pass through the first pane unhindered when the sun is at a low angle, wherein the means for deflecting light are prismatic elevations.

2. The construction element as claimed in claim 1, wherein the first pane is separated from the second pane by transparent thermal insulation.

3. The construction element as claimed in claim 1, further comprising a shading device located in a space between the first pane and the second pane.

4. The construction element as claimed in claim 1, wherein the material that accumulates latent heat is co-extruded with the second pane.

5. The construction element as claimed in claim 1, wherein the material that accumulates latent heat contains a paraffin or salt hydrate that melts at room temperature.

6. The construction element as claimed in claim 5, wherein the material that accumulates latent heat is bonded in a supporting material.

7. The construction element as claimed in claim 1, wherein the material that accumulates latent heat is contained in hollow bodies.

8. The construction element as claimed in claim 7, wherein the hollow bodies have depressions or apertures on the outside or inside.

9. The construction element as claimed in claim 1, wherein the material that accumulates latent heat is heated by heating elements.

10. The construction element as claimed in claim 1, wherein a portion of the second pane or the hollow bodies are colored or coated in a dark color.

11. A construction element to accumulate latent heat for buildings, comprising at least one first transparent pane and a second pane parallel to said first pane, which second pane contains a material that accumulates latent heat, wherein the material that accumulates latent heat is dyed or pigmented so that it absorbs light, at least in the infrared range of the solar spectrum, wherein one of the panes is coated with a Low-E coating and wherein means for deflecting light are arranged on one side of the first pane to deflect sunlight outward when the sun is at a high angle, and allow sunlight to pass through the first pane unhindered when the sun is at a low angle, wherein the material that accumulates latent heat is contained in hollow bodies and wherein the hollow bodies have depressions or apertures on the outside or inside.

* * * * *